April 25, 1933.  R. P. LANSING  1,905,941
FLUID PUMP
Filed Sept. 30, 1931
Fig.1
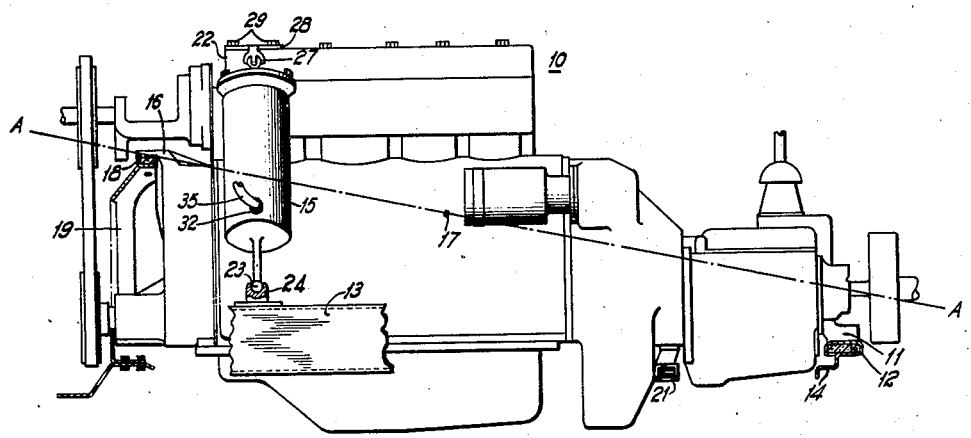
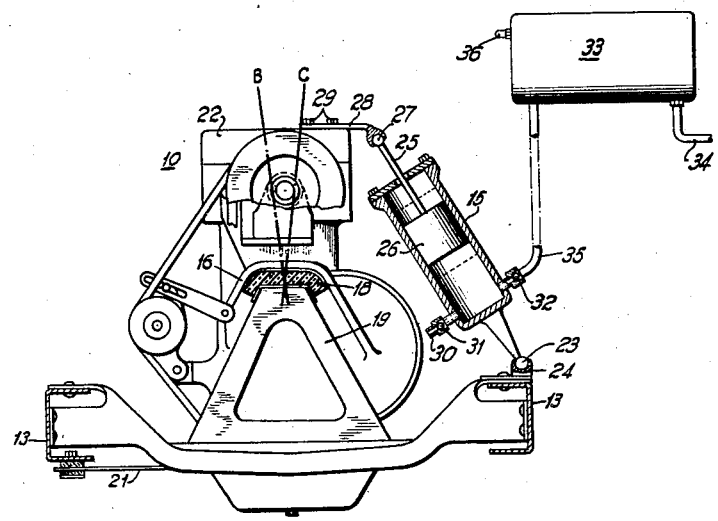
Fig.2
INVENTOR.
Raymond P. Lansing.
BY
J. B. Smith
ATTORNEY Patented Apr. 25, 1933

1,905,941

UNITED STATES PATENT OFFICE

RAYMOND P. LANSING, OF MONTCLAIR, NEW JERSEY, ASSIGNOR TO BENDIX AVIATION CORPORATION, OF SOUTH BEND, INDIANA, A CORPORATION OF DELAWARE

FLUID PUMP

Application filed September 30, 1931. Serial No. 566,126.

This invention relates to pumps, and more particularly to a pump operating mechanism.

One of the objects of the present invention is to provide novel means for mounting and drivably connecting a pump to a power plant, such as an internal combustion engine.

Another object of the invention is to provide a pump in which actuation thereof does not detract from the useful output of the power plant.

Another object of the invention is to provide an engine driven pump in which rotary shafts are eliminated.

Another object of the invention is to provide a pump for an automotive vehicle in which the actuation of the pump is produced by movement of the power plant relative to its supporting frame.

Another object of the invention is to provide a pump for an automotive vehicle having a power plant bodily movable to a limited extent in its supporting frame, in which actuation of the pump is produced by the relative movement of the power plant.

Other objects of the invention will appear from the following description, in connection with which a preferred embodiment has been illustrated in the accompanying drawing, in which:

Fig. 1 is a side elevation of a power plant adapted to be bodily movable in a supporting frame;

Fig. 2 is an end elevation of the power plant shown in Fig. 1 and illustrating the operative connection of the improved pump.

It is well known that reciprocating engines are subject to vibrations, some of which are produced by secondary unbalanced forces and others by torque variations due to a small number of cylinders. The variations in torque impulses are noticeable in all engines having reciprocating parts.

A convenient means of preventing the vibrations from being transmitted to the engine supporting frame, or to a vehicle, for example, is illustrated in Fig. 1, in which the engine 10 is mounted at only two points, one of which is at the rear or driving end of the engine whereat the extension 11 is supported in a yielding mounting 12 adapted to be secured to the engine frame 13 by any desired means, such as arm 14. The front end of the engine is supported by a member 16, preferably located in an axis which includes the engine's center of gravity 17 and the center of extension 11. Member 16 is also preferably supported in a yielding mounting 18, which is connected to the frame 13 by a bracket 19.

The above described method of mounting the engine upon two spaced parallel supports allows the power plant to oscillate as a whole about the axis A—A, and the motion is prevented from being transmitted to the frame 13 by the members 12 and 18. If desired, excessive movement may be damped by the use of a leaf spring 21 secured at one of its ends to the engine case 10 and slidably guided by the frame 13 at its other end. Observation of an engine operating in the above described support shows that it is possible, under some conditions, to obtain a total oscillatory movement of substantially four inches at the upper front end of the engine, designated by 22, and that the amplitude progressively decreases to substantially zero at support 12.

In accordance with the present invention, the oscillatory movement of an engine mounted in the manner described above is employed to operate suitable pumping mechanism, thereby converting energy otherwise lost into useful work. To this end, a pump cylinder 15 (Fig. 2) is preferably connected by a ball and socket joint 23 to a bracket 24 secured to the engine frame 13. Within the cylinder is a piston 26 pivotally connected to the power plant at any point subject to oscillation such as the top of the engine, by rod 25 preferably having a ball and socket connection 27 with a bracket 28 secured to the engine by screws 29. The total oscillatory movement of the engine is indicated by lines B and C, as illustrated in Fig. 2.

Counter-clockwise movement of the engine moves piston 26 upwardly and draws a charge of air through pipe 30 and past check valve 31 into the cylinder 15. The return movement moves the piston 26 downwardly to compress the air therein and force it past outlet check valve 32 through conduit 35 to the reservoir 33, from which it may be led, by pipe 34 to any desired part, such as a hydraulic vehicle brake.

A blow-off valve 36 may be used, if desired, for maintaining the pressure within the reservoir 33 at any desired pressure.

The above described pump is also adaptable to the pumping of other fluids and may be used for providing a supply of fuel or other liquid by connecting inlet pipe 30 to any suitable source of supply.

Other uses will be apparent to those skilled in the art, and although a preferred embodiment of the invention has been shown and described, it is understood that this showing and description are illustrative only and that the invention is not regarded as limited to the form shown and described, or otherwise, except by the terms of the following claims.

What is claimed is:

1. In an automotive vehicle, a substantially rigid frame, a relatively movable power plant mounted longitudinally thereon, and a pump having relatively movable operating members connected respectively to the power plant and the frame.

2. In an automotive vehicle, a substantially rigid frame, a power plant mounted thereon to be oscillatable with respect thereto, and a pump with relatively movable operating members connected respectively to the frame and power plant.

3. In combination, a substantially rigid frame, a power plant mounted thereon to be oscillatable with respect thereto, and a pump with relatively movable cylinder and piston individually connected to the power plant and frame.

4. In an automotive vehicle, a substantially rigid frame, a power plant mounted thereon to be oscillatable about a longitudinal axis with respect to the frame, and a pump with relatively movable operating members respectively connected to the power plant and frame.

5. In an automotive vehicle, a substantially rigid frame, a power plant mounted thereon to be oscillatable about a longitudinal axis with respect to the frame, and a pump with relatively movable cylinder and piston individually connected to the power plant and frame.

6. In an automotive vehicle, a frame, a power plant movably supported thereon by two spaced supports, and a pump with relatively movable operating members respectively connected to the power plant and frame.

7. In an automotive vehicle, a frame, a power plant movably supported thereon by two spaced supports, and a pump with relatively movable cylinder and piston individually connected to the power plant and frame.

8. In an automotive vehicle, a frame, a power plant movably supported thereon by two axially extending members, and a pump with relatively moving operating members respectively connected to the power plant and frame.

9. In an automotive vehicle, a frame, a power plant movably supported thereon by two axially extending members, and a pump with relatively moving cylinder and piston individually connected to the power plant and frame.

10. In an automotive vehicle, a frame, a power plant resiliently supported thereon by two vertically spaced axially extending members, and a pump with relatively movable operating members respectively connected to the power plant and frame.

11. In an automotive vehicle, a frame, a power plant resiliently supported thereon by two vertically spaced axially extending members, and a pump with relatively movable cylinder and piston individually connected to the power plant and frame.

12. In an automotive vehicle, a frame, a power plant having a driving shaft and being resiliently supported on the frame by two axially spaced members and adapted to oscillate about an axis intersecting the driving shaft, a pump including relatively movable operating parts, one of which is pivotally connected to a part of the power plant spaced from the oscillatory axis, and the other of which is pivotally connected to the power plant supporting frame.

13. In an automotive vehicle, a frame member, a power plant member having a driving shaft, said power plant being mounted on the frame to oscillate about an axis forming an acute angle with the driving shaft, and a pump including relatively movable operating parts connected respectively to the power plant and frame members, the connection between one of said parts and its respective member including a universal joint.

14. In an automotive vehicle, a frame member, a power plant member having a driving shaft, said power plant being mounted on the frame to oscillate about an axis forming an acute angle with the driving shaft, and a pump including relatively movable operating parts connected respectively to the power plant and frame members, the connection between each of said parts and its respective member including a universal joint.

In testimony whereof I have signed this specification.

RAYMOND P. LANSING.